UNITED STATES PATENT OFFICE.

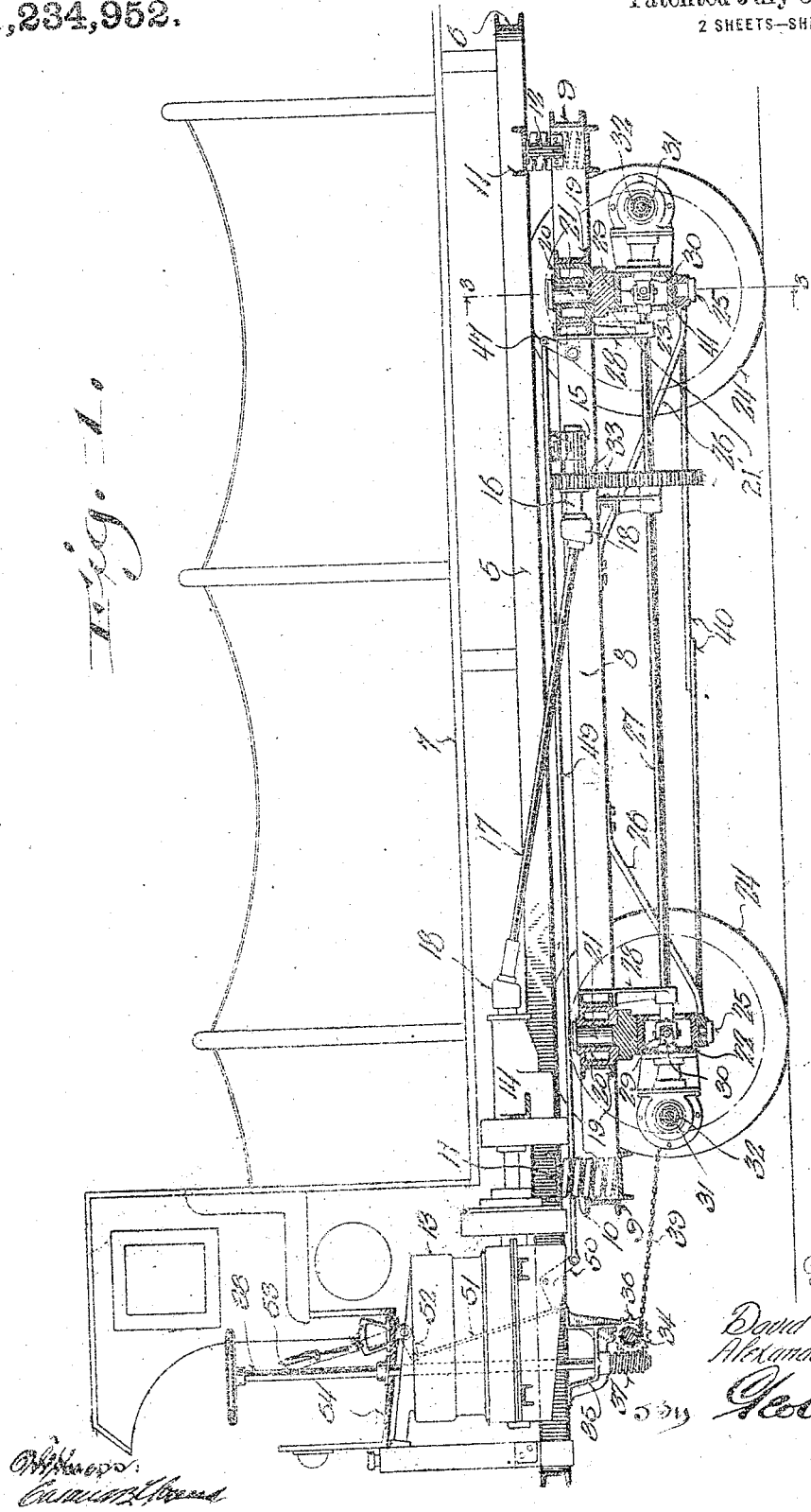

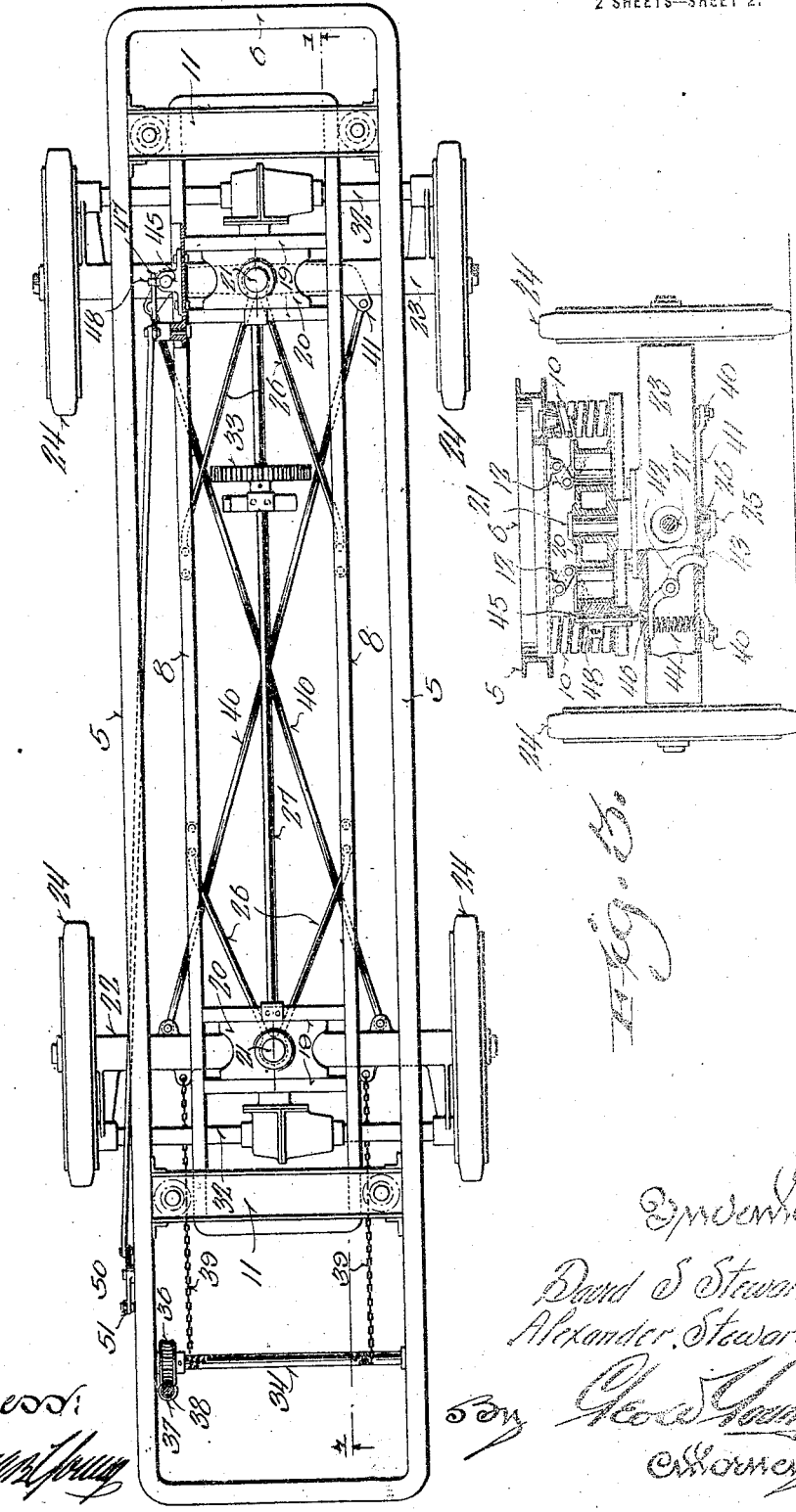

ALEXANDER STEWART, OF CLINTONVILLE, AND DAVID S. STEWART, OF APPLETON, WISCONSIN, ASSIGNORS TO FOUR WHEEL TRACTOR CO., OF CLINTONVILLE, WISCONSIN.

FOUR-WHEEL-DRIVE TRUCK.

1,234,952.

Specification of Letters Patent.

Patented July 31, 1917.

Application filed November 11, 1916. Serial No. 130,781.

*To all whom it may concern:*

Be it known that we, ALEXANDER STEWART and DAVID S. STEWART, both citizens of the United States, and residents of Clintonville, in the county of Waupaca and State of Wisconsin, and of Appleton, in the county of Outagamie and State of Wisconsin, respectively, have invented certain new and useful Improvements in Four-Wheel-Drive Trucks; and we do hereby declare that the following is a full, clear, and exact description thereof.

The present invention relates to new and useful improvements in heavy duty motor trucks of the four wheel drive type, and more particularly of the type shown in Patent No. 1105218 granted to David S. Stewart July 28, 1914.

It is in general the object of the present invention to simplify and otherwise improve the structure and to increase the efficiency of motor driven vehicles of this nature.

In view of the rough roads encountered by trucks of this nature a consequently relatively great amount of shock is imparted thereto, and it is an important object of the invention to provide an arrangement whereein the motor of the truck is afforded a resilient support to relieve shocks therefrom. It is more specifically an object in this connection to provide upper and lower spring connected chassis and to provide an efficient drive connection between a motor carried by the upper chassis and wheels carried by the lower chassis.

Four wheel drive trucks are usually steered by a simultaneous turning movement of both the front and rear wheels, whereby the truck may turn in a relatively small circle. In some instances, as when the rear wheels of the truck become mired, the steering movement of the rear wheels materially interferes with effort to dislodge them, and it is therefore an object of the present invention to provide an arrangement whereby the rear wheels may be selectively coupled with the front wheels for simultaneous steering movement therewith, or may be released from said front wheels and locked to the chassis.

With the above and other objects and advantages in view the invention resides more particularly in the novel combination, arrangement and formation of parts herein described and pointed out in the appended claims. In the drawings:

Figure 1 is a vertical longitudinal sectional view of a four wheel drive truck embodying the present invention, the body of the truck being illustrated in conventional outline, and the plan view being indicated by the line 1—1 of Fig. 2.

Fig. 2 is a plan view of the chassis structure of the truck.

Fig. 3 is a transverse sectional view through the rear axle portion of the truck on the line 3—3 of Fig. 1, and showing the means for controlling the steering movement of the rear axle.

Referring now more particularly to the accompanying drawings, the truck shown therein comprises an upper chassis including the side sills 5 and end sills 6 and carrying a conventionally designated truck body 7, and disposed below this chassis 5 is a relatively smaller chassis including side sills 8 and transverse sills 9 and which is connected with the upper chassis by expansile springs 10 upstanding at its corners and engaging transverse sills 11 of the upper chassis.

The chassis are held against relatively horizontal movements preferably by pairs of pivotally connected links 12 pivoted thereto at their corner portions, although it will be appreciated that in some instances conventional elliptical springs may be substituted for the expansile coil springs 10. The forward end of the upper chassis carries the engine 13 and usual transmission 14. Journaled in a bearing 15 carried by a transverse sill of the lower chassis is a longitudinally extending stub-shaft 16 and this stub-shaft and the transmission are connected by an extensible shaft 17 having its ends universally coupled at 18 to the transmission and stub-shaft. Thus the engine and transmission, being carried by the upper spring mounted chassis, are relieved of the shock and vibration incidental to travel over rough roads, and the power of the engine is efficiently transmitted to the lower chassis.

Adjacent its ends, the lower chassis is provided with pairs of cross sills 19 which carry centrally disposed bearing blocks 20 in each of which is journaled a vertical pivot pin 21 carried by a block 21′ and to these blocks are secured the preferably hollow front and rear axles 22 and 23 respectively carrying the wheels 24. Depending centrally from each of the axles is a pintle 25 to which pintles are journaled the outer connected ends of a pair of radius bars 26 extending inwardly and upwardly therefrom and secured to the side sills 8 of the lower chassis.

For independently driving the wheels 24, as in the structure of my previous patent, a shaft 27 extends longitudinally of the truck and is journaled in the depending hanger arms 28 carried by cross sills 19, the ends of the shaft extending into the axles and being connected by the universal couplings 29 with stub-shafts 30 which extend outwardly of the axles for connection with transverse shafts 31 disposed within sleeves 32 carried by the axles and having suitable driving engagement with peripheral portions of the wheel, as more particularly shown in my said previous patent. The axes of the universal joints and the pivots of the axles are in vertical alinement and thus the axles may be steered without affecting the drive connections of the wheels. The shaft 27 is driven from the stub-shaft 16 by inter-meshing gears 33 and while I have shown simply a pair of gears, it is obvious that any other gear arrangement may be employed, and if desired the gears 33 may embody a differential drive, in which instance the shaft 27 would be in sections.

For steering the truck a transverse shaft 34 is journaled in depending bearing brackets 35 at the forward portion of the upper chassis and carries a pinion 36 meshing with a worm 37 on the lower end of an up-standing steering column 38. Wound on the shaft 34 are chains 39 which are extended rearwardly and secured to the front axle 22. Steering movement of the front axle is imparted to the rear axle by links 40 secured to the front axle and extending rearwardly in diagonal crossed relation for attachment to the forwardly turned ends of a bar 41 pivotally mounted on the depending pintle 25, before mentioned, of the rear axle. This bar is normally locked to the axle by the engagement of a downwardly curved end of an intermediately pivoted lever 42 in alined apertures 43 of the axle and bar, this lever being disposed in the hollow rear axle and normally urged to a position locking the axle and bar together by a spring 44 within the axle and bearing against the normally horizontally disposed upper portion of the lever 42.

For disengaging the lever from the bar 41 to permit independent steering actuation of the front axle, a vertically slidable bar 45 is carried by the lower chassis and is adapted to pass into an opening 46 in the top of the axle to engage and rock the lever 42, thus locking the axle and chassis together prior to the release of the rear wheel steering mechanism procured by rocking the lever 42. For actuating this pin from a point adjacent the driver's seat of the truck, a bell-crank lever 47 is pivoted to the chassis and has one end engaging an up-standing lug 48 on the pin 45. To the other end of the bell-crank lever is secured a link 49 which extends to the forward portion of the truck and is pivoted to one arm of a second bell-crank lever 50. To the other arm of this bell crank lever is pivoted a link 51 which is also pivotally connected with a lateral rock arm 52 of a pawl controlled lever 53 journaled adjacent the floor 54 of the driver's compartment of the truck. Thus upon rocking the lever 53 the steering actuation of the rear axle is controlled.

Inasmuch as the arm of the bell-crank lever 47 to which is attached the link 49 extends upwardly, relative movement of the upper and lower movement of the chassis, due to spring pressure will not materially affect the relation of the lever structure. Also it is noted that inasmuch as the steering chain shaft is disposed in a relatively lowered position, relative movement of the chassis will not affect the steering function of the truck.

While I have shown and described one preferred form of my invention it is apparent that to meet differing conditions of use various changes and modifications of structure may be resorted to without departing in any manner from the scope of the invention as interpreted by the appended claims.

What is claimed:

1. A motor driven vehicle including a chassis, front and rear pivoted wheeled axles, means for steering the front axle, a bar pivoted to the rear axle, links connecting said bar and the front axle, and means for selectively locking said bar to the rear axle.

2. A motor driven vehicle including a chassis, front and rear pivoted wheeled axles, means for steering the front axle, a bar pivoted to the rear axle, links connecting said bar and the front axle, means for selectively locking said bar to the rear axle, and means for locking the rear axle against pivotal movement.

3. A motor driven vehicle including a chassis, front and rear pivoted wheeled axles, means for steering the front axle, a bar pivoted to the rear axle, links connecting said bar and the front axle, a movable member carried by the rear axle and engageable with the bar to hold said axle and bar against relative pivotal movement, and a member carried by the chassis and movable to engage said first member to release the bar and rear axle and to hold the rear axle against pivotal movement with respect to the chassis.

4. A motor driven vehicle including a chassis, front and rear pivoted wheeled axles, means for steering the front axle, a bar pivoted to the rear axle, a spring urged movable member carried by the rear axle and engageable with the bar to hold said axle and bar against relative pivotal movement, means connecting said bar with the front axle, and means carried by the chassis for operating said movable member to release the bar and rear axle and to hold the rear axle against pivotal movement with respect to the chassis.

5. A motor driven vehicle including a chassis, front and rear pivoted wheeled axles, means for steering the front axle, a bar pivoted to the rear axle, links connecting said bar and the front axle, a lever pivoted in the rear axle and engageable with the bar to hold said axle and bar against relative pivotal movement, a member carried by the chassis and movable to rock said lever to release the bar and rear axle and to hold the rear axle against pivotal movement with respect to the chassis, and means for manipulating the member carried by the chassis, said means being in juxtaposition with the means for steering the front axle.

6. A motor driven vehicle including a chassis, front and rear pivoted wheeled axles, means for steering the front axle, a bar pivoted to the rear axle, links connecting said bar and the front axle, a spring urged lever mounted in the rear axle and adapted to engage the bar to hold said axle and bar against relative pivotal movement, a slidable bar carried by the chassis and movable to depress one end of the rocking lever to release the bar and rear axle and to hold the rear axle against pivotal movement with respect to the chassis, and an operating lever located within reach of the driver of said vehicle and in connection with said slidable bar, substantially as described.

In testimony that we claim the foregoing we have hereunto set our hands at Appleton, in the county of Outagamie and State of Wisconsin, in the presence of two witnesses.

ALEXANDER STEWART.
DAVID S. STEWART.

Witnesses:
  WM. CAMPBELL,
  FRANK GROH.